United States Patent

Hocking

[11] B 3,981,126
[45] Sept. 21, 1976

[54] SAFETY SUPPORT FOR HARVESTER COMBINE FEEDERS

[75] Inventor: Thomas A. Hocking, Colona, Ill.

[73] Assignee: International Harvester Company, Chicago, Ill.

[22] Filed: Mar. 17, 1975

[21] Appl. No.: 558,973

[44] Published under the second Trial Voluntary Protest Program on February 10, 1976 as document No. B 558,973.

[52] U.S. Cl. .................................. 56/15.9; 56/1
[51] Int. Cl.² ........................................ A01D 41/06
[58] Field of Search .................... 56/14.3–14.6, 56/2, 208, 1, 15.9, 16.1, 16.3

[56] References Cited
UNITED STATES PATENTS
2,949,716   8/1960   Thompson ........................ 56/14.3

Primary Examiner—Hugh R. Chamblee
Assistant Examiner—J. N. Eskovitz
Attorney, Agent, or Firm—F. David Aubuchon; Floyd B. Harman

[57] ABSTRACT

A safety support for maintaining the feeder of a harvester combine, together with its associated header, in an elevated position in case of failure of the usual lift cylinder. A telescopic brace has its forward end pivoted to the feeder and, when in a predetermined extended operative condition, has facilities at its rear end whereby it is supported on the front axle housing of the combine so that it may function under compression to assimilate the weight of the feeder and maintain the latter elevated. In a collapsed inoperative position the brace closely underlies the bottom wall of the feeder in a stored position and is held in such position by a suspension bracket which supports the rear end of the brace. A single anchor pin cooperates with the brace to maintain the latter in its extended position and also cooperates with the suspension bracket to maintain the rear end of the collapsed brace in an elevated position.

11 Claims, 5 Drawing Figures

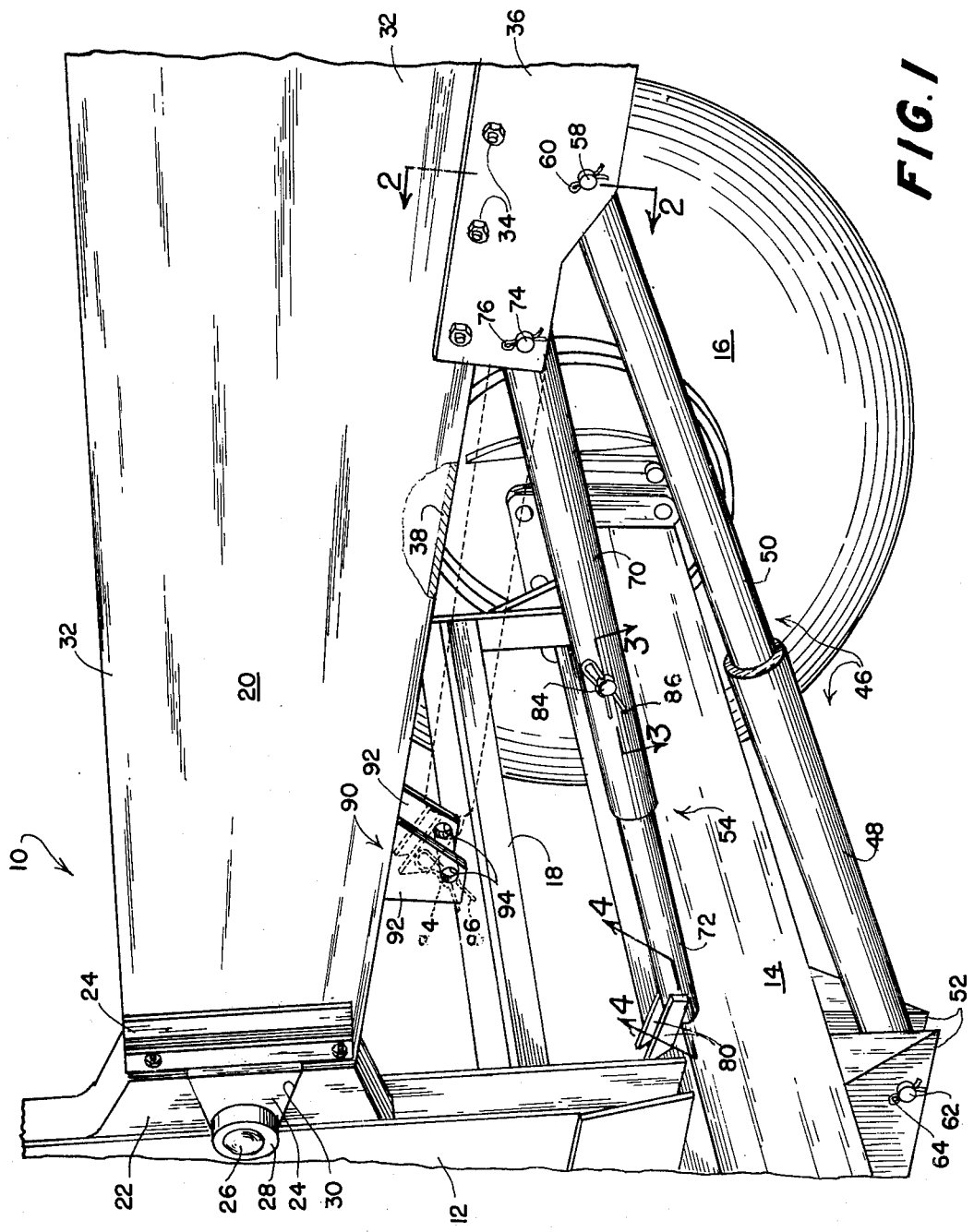

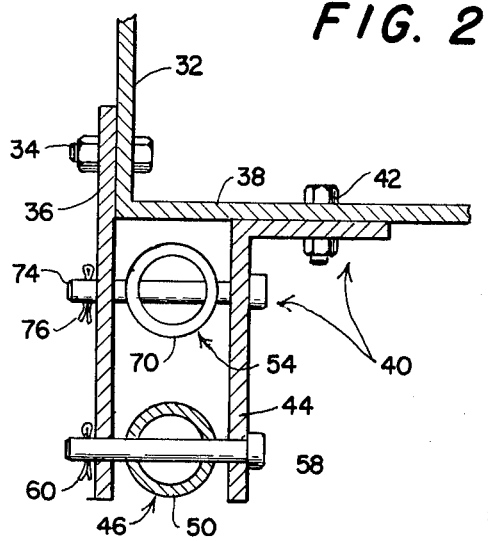
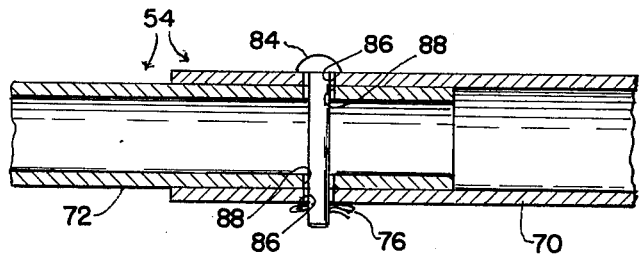
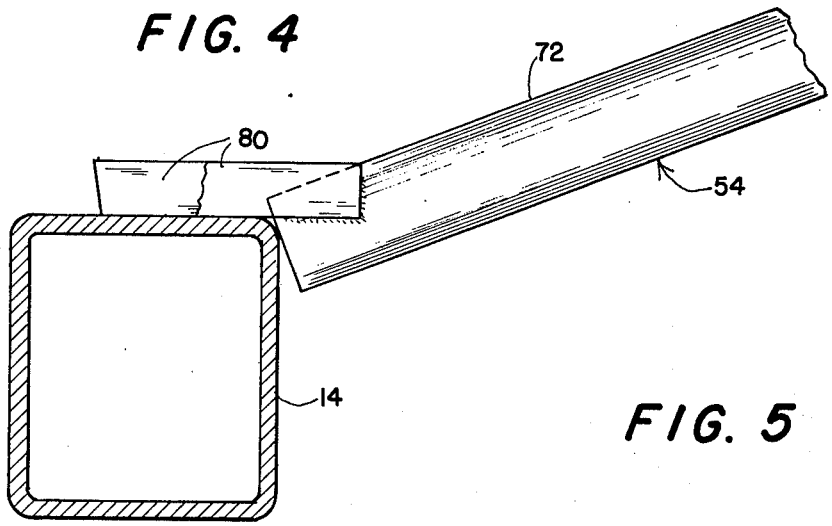
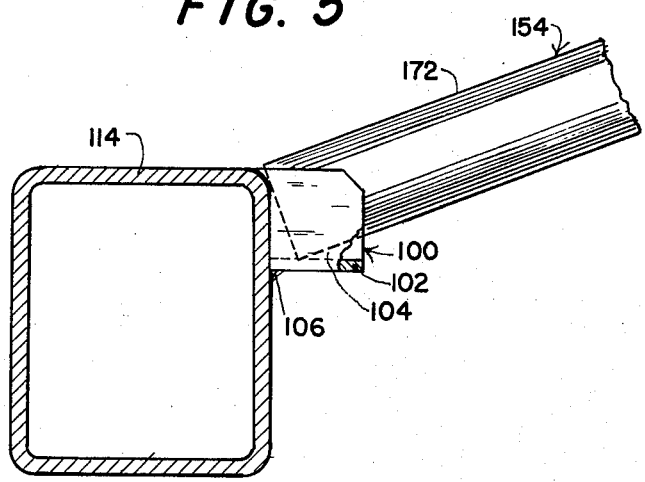

SAFETY SUPPORT FOR HARVESTER COMBINE FEEDERS

The present invention relates to a safety support for maintaining a harvester combine feeder and its associated header in an elevated off-ground position in the event that the usual hydraulic lift cylinder which ordinarily performs such function should lose its pressure or otherwise collapse during maintenance or repair work on either the feeder or its associated header.

Heretofore, during repair or other work on the forward end of a harvester combine, and particularly on the feeder or header portion thereof, it has been customary to use a jack or pivoted stands between the feeder and or the header and the ground to prevent falling of these members in the event that the conventional hydraulic lift mechanism should fail. When not in use, such stands had facilities whereby they could be bolted or otherwise secured in a horizontal position along the underneath side of the feeder casing where they assume an out-of-the-way positions. When they are to be put to use, they may be unfastened and then swung downwardly to normal vertical positions where their lower ends rest on the ground so that such stands assimilate the weight of the feeders.

Pivoted stands of this general character are not altogether satisfactory in that where soft ground is concerned the support which they offer is not always stable and collapse thereof may occur. Furthermore being subject to contact with the ground, dirt accumulation on the lower ends thereof occasionally will interfere with the bolting or other fastening means whereby they are held in their retracted inoperative positions. Still further, unevenness in the terrain may place the load only on one side or other portion of the stand so that the load is not evenly distributed.

The present invention is designed to overcome the above-noted limitations that are attendant upon the construction and use of conventional feeder supporting stands and, toward this end, the invention contemplates the provision of a novel safety stand for a combine header which, instead of depending upon the ground for its reaction support, utilizes the front combine axle housing for reaction purposes.

More specifically, the invention embodies a two-part telescopic tubular supporting strut or brace. The forward or proximate end of the brace is pivoted to the feeder, preferably to or near the bottom wall thereof at a point appreciably removed from the rear pivoted end of the feeder, and, when the brace is fully extended, the rear or distal free end thereof is adapted to seat upon the front axle housing of the combine so that if fluid pressure in the lift cylinder which normally supports the feeder in its elevated position fails, the axle serves as a reaction member to prevent the feeder from falling or sagging. In one form of the invention, the free end of the brace is shouldered so that it rests upon the top of the axle housing and also bears endwise against its front surface so that the brace is placed under compression for feeder supporting purposes. In a modified form of the invention, the axle is formed with a supporting cradle for the free end of the brace. In either form of brace, a storage bracket is mounted on the underneath side of the bottom wall of the feeder and holds the free end region of the brace closely nested against the feeder in an out-of-the-way position when the brace is not in use, the telescopic brace assuming a retracted partially telescoped condition at such time. A single or common locking pin is used either to maintain the telescopic brace fully extended or to anchor the free end of the brace within the supporting bracket.

The provision of a feeder safety stand such as has been briefly outlined above constitutes the principal object of the present invention. Other objects and advantages of the invention, not at this time enumerated, will readily suggest themselves as the nature of the invention is better understood.

In the accompanying two sheets of drawings forming a part of this specification, two embodiments of the invention have been illustrated.

In these drawings:

FIG. 1 is a fragmentary right perspective view of the front portion of a harvester combine, showing the right side of a conventional feeder and its associated lift cylinder applied to the combine, and also showing one of the improved safety stands or braces installed thereon and disposed in its operative feeder-supporting position;

FIG. 2 is an enlarged sectional view take substantially on the vertical plane indicated by the line 2—2 of FIG. 1 and in the direction of the arrows;

FIG. 3 is an enlarged sectional view taken substantially on the horizontal plane indicated by the line 3—3 of FIG. 1 and in the direction of the arrows;

FIG. 4 is an enlarged sectional view taken substantially on the horizontal plane indicated by the line 4—4 of FIG. 1 and in the direction of the arrows; and FIG. 5 is a fragmentary sectional view, similar to FIG. 4, of a modified form of axle-mounted cradle support which may be employed in connection with the invention.

Referring now to the drawings in detail and in particular to FIG. 1 wherein a fragmentary portion of a conventional harvester combine is disclosed and designated by the reference numeral 10, only a fragment of the combine right side wall 12, the front axle housing 14, the front left wheel 16, and certain undercarriage structure 18 being disclosed in this view. A conventional feeder 20 is hingedly connected to the forward end of the combine 10 by the usual left and right pivot connections, only the right connection being disclosed herein, such connection consisting of a recessed pivot block 22 which is mounted on the side wall 12, and a removable retainer 24, the latter serving to capture and maintain a pivot pin 26 and its associated bushing 28 within the recess 30 which is provided in the block. The pivot pin and bushing are carried by the right side wall 32 of the feeder 20.

Secured by bolts 34 to the side wall 32 of the feeder 20 is a suspension plate 36 which overhangs and depends below the level of the bottom wall 38 of the feeder (see also FIG. 2). An anglepiece 40 is secured to the underneath side of the bottom wall 38 by means of bolts 42 and has a vertical flange 44 which opposes and is spaced laterally from the plate 36. A lift cylinder 46 including a cylinder proper 48 and a plunger 50 effectively extends between the axle housing 14 and feeder 20, the upper end portion of the plunger 50 projecting between the plate 36 and flange 44 as best shown in FIG. 2 and the lower end portion of the cylinder proper 48 projecting between a pair of supports 52 which are welded or otherwise secured to the underneath side of the axle housing 14. The plate 36 and flange 44, in combination with each other, also function as a reaction support for the upper end of a safety stand or brace assembly 54 which constitutes the principal feature of the present invention and the nature of which will be made clear presently. The upper end of the plunger 50 is secured in position between the plate 36 and flange 44 by a pin 58 and its associated cotter pin 60, while the lower end of the cylinder proper 48 is similarly secured between the supports 52 by a pin 62 and its associated cotter pin 64. It will be understood that a similar lift cylinder is provided on the left side of the feeder and is similarly mounted.

The brace assembly 54 is comprised of two principle tubular telescopic parts including an upper outer forward part 70 and a lower inner rearward part 72. The upper end of the upper outer part 70 projects between the plate 36 and flange 44 and is secured in position by a pin 74 and its associated cotter pin 76. The lower end of the lower part 72 has welded to the opposite sides thereof a pair of vertically disposed rest plates 80 the function of which will be made clear presently.

The inner part 72 is telescopically slidable within the outer part 70, as shown in FIGS. 1 and 3, a locking pin 84 projects through a first pair of diametrically opposed holes 86 in the outer tubular part 70 and a second pair of diametrically opposed holes 88 in the inner part 72 when the brace 54 is in its operative feeder-supporting position. When in such position, the foward end face of the inner part 72 bears against the forward side face of the axle housing 14 at its radius to the top face while the two rest plates 80 make edge-to-face contact with the top face of the axle housing 14, the downward thrust of the feeder 20 being assimilated by the locking pin 84.

As shown in FIG. 1, an inverted U-shaped storage or parking bracket 90 is welded or otherwise fixedly secured to the bottom wall 38 of the feeder 20 and is formed with downwardly projecting flanges 92 having aligned holes 94 formed therein. The function of the bracket 90 is to support the stand or brace 54 in an elevated stored or parked position immediately beneath the feeder 20 as shown in dotted lines when the brace is not in use. Normally, when the combine is in operation, the locking pin 84 is disposed in the two holes 94 in the flanges 92 of the parking bracket 90 so that the rest plates 80 project between the flanges and are supported upon the locking pin as shown in dotted lines, thus maintaining the stand 54 as a whole closely nested beneath the bottom wall 38 of the feeder and in a telescopically collapsed condition.

When it is desired that the stand or brace 54 shall be put to use in supporting the feeder 20, the lift cylinder 46 will be appropriately operated by supplying fluid to the lower end thereof, thereby projecting the plunger 50 to raise the feeder 20 to an elevation slightly higher than that which is capable of being maintained by the stand or brace 54. Thereafter, the locking pin 84 is withdrawn from the holes 94 in the flanges 92 of the bracket 90 (FIG. 1) so as to free the brace or stand 54 which may then be lowered and the rear end thereof brought to the level of the axle housing 14, after which the brace may be extended and the two rest plates 80 caused to be supported on the upper face of the axle housing as shown in full lines. At this time a slight adjustment of the lower inner part 72 of the brace may be resorted to to effect alighnment of the holes 86 and 88 (see also FIG. 3) in the parts 70 and 72, after which the locking pin 84 may be operatively installed in such holes, thus rigidifying the brace in its extended condition. Then, when the rest plates 80 still supported on the axle housing 14, by relieving the pressure of fluid in the lift cylinder 46, the feeder 20 and its associated header may be lowered bodily as a unit so that the rear end of the inner part 72 will bear against the forward side of the axle housing 14 and the brace will be placed under compression so as to support the feeder 20.

Restoration of the brace or stand 54 to its parked or stored position is readily accomplished by supplying sufficient fluid to the lift cylinder 46 so as to relieve the compression in the brace 54 and then withdrawing the locking pin 84 from the holes 86 and 88, collapsing the brace, and reapplying it to the bracket 90 and securing it in position by utilizing the same locking pin 84 and its associated cotter pin 86.

In FIG. 5 a slightly modified form of the invention is disclosed. In this form of the invention the brace assembly 154, instead of utilizing the two rest plates 80 on the inner part 72 to support the free end of the brace on the axle housing 14, a cradle member 100 in the form of a short channel section having a bottom wall 102 and upstanding side walls 104 is welded as indicated at 106 to the front side of the axle housing 114 so as to receive the rearward end of the inner part 172 therein. Otherwise the brace assembly 154 remains substantially the same as the brace assembly 54. Therefore, in order to avoid needless repetition of description, similar reference numerals but of a higher order have been applied to the corresponding parts as between the disclosures of FIGS. 4 and 5 respectively.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In a harvester combine having a framework including a horizontally disposed transverse axle housing, a crop feeder pivoted at its rear end to the forward end of the combine framework for swinging movements between an operative crop infeed position and a raised inoperative position, and at least one hydraulically operable lift cylinder effective between said framework and feeder for producing such swinging movements, the improvement which compresses an extensible and contractible brace-like safety stand effective in compression between said axle housing and feeder for maintaining the latter in a predetermined elevated position, said safety stand comprising at least one extensible and contractible pair of telescopic inner and outer parts including a forward part effectively pivoted to a forward region of the feeder and a rearward part engageable with said axle housing when said stand is in its fully extended position, a removable pin projecting diametrically through said outer part and serving to maintain the stand in such fully extended position, and a parking bracket fixedly secured to said feeder rearwardly of the point of pivotal connection between said forward part and the feeder and the effective to support the rear end portion of the rear part when said pin is removed and said stand is contracted.

2. In a harvester combine, the combination set forth in claim 1, wherein the rear end of said rear stand part is provided with a shoulder which rests upon the upper side of the axle housing and with a rear end face which abuts against the forward side of the axle housing when the stand is in its fully extended position.

3. In a harvester combine, the combination set forth in claim 1, wherein the rear stand part is provided with a rest plate secured to such stand part, such rest plate abutting against the upper side of the axle housing while at the same time the rear end face of said stand part abuts against the forward side of the axle housing when the stand is in its fully extended position.

4. In a harvester combine, the combination set forth in claim 1, wherein said axle housing is rectangular in cross section and presents a horizontal upper surface and a vertical front surface, a pair of flat rest plates are fixedly secured to and overhang said rear stand part on opposite sides of the latter, said rest plates make edge-to-face contact with the upper horizontal surface of the axle housing while the rear end face of the rear stand part abuts against the forward front surface of the axle housing when the stand is in its fully extended position.

5. In a harvester combine, the combination set forth in claim 1, wherein said parking bracket embodies a pair of downwardly extending spaced apart vertical flanges having aligned holes therein through which said locking pin is adapted to removably project while the overhanging portions of said rest plates are adapted to project between said flanges and rest upon said locking pin when said stand is in a raised fully contracted position.

6. In a harvester combine, the combination set forth in claim 5, wherein said crop feeder is generally rectangular in transverse cross section and is provided with a bottom wall, and the parking bracket is of inverted U-shape channel construction and is fixedly secured to the bottom wall of the feeder.

7. In a harvester combine, the combination set forth in claim 5, wherein both of said stand parts are of tubular construction and the forward part of the stand constitutes the outer part.

8. In a harvester combine, the combination set forth in claim 4, wherein said parking bracket embodies a pair of downwardly extending spaced apart vertical flanges having aligned holes therein through which said locking pin is adapted to removably project while the overhanging portions of said rest plates are adapted to project between said flanges and rest upon said locking pin when said stand is in a raised fully contracted position.

9. In a harvester combine, the combination set forth in claim 8, wherein said crop feeder is generally rectangular in transverse cross section and is provided with a bottom wall, and the parking bracket is of inverted U-shape channel construction and is fixedly secured to the bottom wall of the feeder.

10. In a harvester combine, the combination set forth in claim 1, wherein both of said stand parts are of tubular construction and the forward part of the stand constitutes the outer part.

11. In a harvester combine, the combination set forth in claim 1, wherein the forward side of the axle housing is provided with a cradle member having a bottom wall and upstanding side walls and the rear end of the rear stand part is received in said cradle member and abuts against the forward side of the axle housing when the stand is in its fully extended position.

* * * * *